United States Patent [19]

Tieleman et al.

[11] Patent Number: 5,080,630

[45] Date of Patent: Jan. 14, 1992

[54] POULTRY PROCESSING APPARATUS AND METHOD

[75] Inventors: Rudolf J. Tieleman, Doesburg; Antoine J. H. Winkelmolen, Arnhem, both of Netherlands

[73] Assignee: Tieleman Food Equipment B.V., Doesburg, Netherlands

[21] Appl. No.: 508,349

[22] Filed: Apr. 9, 1990

[30] Foreign Application Priority Data

Apr. 7, 1989 [EP] European Pat. Off. ............ 89200870

[51] Int. Cl.$^5$ ............................................... A22B 3/08
[52] U.S. Cl. ............................ 452/165; 452/179; 452/170; 452/177
[58] Field of Search ............ 17/11, 11 B, 11 D, 11 R, 17/24, 44.1, 46, 52; 452/165, 179, 170, 177

[56] References Cited

U.S. PATENT DOCUMENTS

| | | | |
|---|---|---|---|
| 2,306,773 | 12/1942 | Biffinger | 17/11 |
| 3,639,945 | 2/1972 | Duncan et al. | 17/52 |
| 3,930,282 | 1/1976 | Martin et al. | |
| 4,016,624 | 4/1977 | Martin et al. | 17/11 |
| 4,019,223 | 4/1977 | Baker | 17/11 B |
| 4,041,572 | 8/1977 | Martin et al. . | |
| 4,102,014 | 7/1978 | Martin et al. . | |
| 4,208,764 | 6/1980 | Loth et al. . | |
| 4,327,463 | 5/1982 | Martin . | |
| 4,385,421 | 5/1983 | Martin | 17/52 |
| 4,424,608 | 1/1984 | Martin . | |
| 4,477,942 | 10/1984 | Martin . | |
| 4,480,353 | 11/1984 | Martin et al. . | |
| 4,503,587 | 3/1985 | Martin . | |
| 4,563,791 | 1/1986 | Martin et al. . | |
| 4,648,155 | 3/1977 | Eurnett . | |
| 4,780,930 | 11/1988 | Sparka | 17/44.1 |
| 4,827,570 | 5/1989 | Scheier et al. . | |
| 4,873,746 | 10/1989 | Scheier et al. . | |
| 4,937,918 | 7/1990 | Martin | 452/165 |

FOREIGN PATENT DOCUMENTS

| | | | |
|---|---|---|---|
| 2048246 | 4/1971 | Fed. Rep. of Germany . | |
| 3431349 | 3/1986 | Fed. Rep. of Germany . | |
| 3733585 | 1/1989 | Fed. Rep. of Germany . | |
| 0086700 | 8/1983 | France | 17/24 |
| 410782 | 10/1966 | Switzerland . | |
| 1272263 | 4/1972 | United Kingdom . | |
| 2132154 | 7/1984 | United Kingdom . | |

OTHER PUBLICATIONS

"Linco Alec", Complete In-Line Eusceration System, Linholst & Co. A/S, Trige, Denmark.

Primary Examiner—D. S. Meislin
Assistant Examiner—Lawrence Cruz
Attorney, Agent, or Firm—Beveridge, DeGrandi & Weilacher

[57] ABSTRACT

A poultry processing machine supports birds on mandrels mounted on carriers which move in a rectangular path. The birds move continuously in opposite directions along two opposite sides of the rectangular path; and, they move intermittently in opposite directions along the other two sides of the path. Continuous movement is provided by chains with lugs which enter recesses formed in the carriers. Intermittent movement is provided by cylindrical cams which engage cam followers on the carriers and also force adjacent carriers together to couple them. The mandrel has a groove for receiving the backbone, projections for engaging the kidney spaces inside the body, and a shoulder for engaging the anterior end of the breastbone. It is pivoted to an upright position, a back-up position and a breast-up position as it travels around the apparatus. At the corners of the path, the carriers change their direction of movement without turning bodily. The bird's skin is cut around the perimeter of the thigh, the thigh joint is disjointed, the ligaments and/or tendons in the thigh joint are severed, and the leg is pulled from the body while the body is moving in an anterior back-up position. The wing/breast parts are pulled from the body when the body is moving in an anterior breast-up position.

30 Claims, 7 Drawing Sheets

POULTRY PROCESSING APPARATUS AND METHOD

BACKGROUND OF THE INVENTION

This invention relates to a method and apparatus for processing poultry, especially eviscerated birds, so as to remove the wings, breasts and/or legs from the birds' bodies.

Machines are presently available for removing the wings/breast parts and thigh/drumstick parts from eviscerated birds. It is known in the poultry processing industry to cut a bird transversely to divide it into halves, one half thereafter being processed on a wing/breast line and the other half being processed on a leg line where the thigh/drumstick part is removed.

One object of the present invention is to simplify the method and apparatus so that the halving step is omitted and labor costs are reduced by eliminating the manual transfer operations between machines and processing lines.

In the industry, mechanized processing machines are generally either of the continuous motion type, but there have been a few machines of the intermittent motion type. In a continuous motion machine, the birds or their parts are moved at a constant velocity whereas, on intermittent motion machines, the birds or their components move in a step-by-step fashion. Some operations, particularly those where the location of a cut must be precise, are best performed when a bird is stationary. Other operations such as those in which meat is pulled from the body are more effectively performed during continuous movement.

An object of the present invention is to provide a machine which provides both intermittent movement and continuous movement, so that processing steps can be performed where the most suitable type of movement is occurring.

The removal of the thigh of a bird which still has its breast and wings attached raises certain problems when the birds are moving along a fixed path through the machine, inasmuch as provisions must be made so that tools along the bird's path will operate on the thighs but not on the wings or breasts. Objects of the present invention are to divert the thighs so that they follow a different path from the wings, and to use a tendon cutting blade that is normally spaced outside the path of the wings and breast and then is moved to a cutting position which cuts the thigh joint tendons.

It is known in the industry to place eviscerated birds on movable mandrels for manual or machine processing, but the configuration and mounting of prior mandrels has imposed certain limitations. A known type of machine has a mandrel which is upright for loading purposes and is then pivoted down so that the bird is in a reclining orientation as it is processed by the machine. However, only one reclining position is available, and no processing operations are performed on the bird when the mandrel is upright. According to the present invention, however, the mandrel is capable of moving through paths and at orientations which heretofore were not possible in poultry processing apparatus. These paths and orientations are available so that operations can be performed while the birds are at a most appropriate orientation and are travelling in the most suitable direction. Additionally, the configuration of the mandrel is novel and superior to existing mandrels.

The invention has many other objectives. By way of example, one object of the invention is to provide a rectangular path of movement of a bird being processed, such a path being known in other environments but not in association with poultry processing apparatus. Another object is to provide an apparatus which will precisely position birds so that they are always at a suitable position and orientation when operations are performed thereon.

SUMMARY OF THE INVENTION

This invention relates to methods and apparatus for processing poultry, and specifically to improvements to known systems in which portions are removed from eviscerated birds mounted on bird mounting units on carriers which move along a track.

In one respect, the improvement according to the invention involves the provision of a rectangular track. Preferably, there are continuous drive means for continuously moving the carriers along two opposite sides of the rectangular track; and, there are intermittent drive means for intermittently moving the carriers along the two other sides of the rectangular track. The carriers may have recesses which are engageable by lugs on a sprocket chain of the continuous drive means, and the intermittent drive means includes a continuously driven cylindrical drum with a cam surface which engages cam follower surfaces on the carriers. The cam surface is preferably formed by a driving groove on the outer surface of the cam drum. The groove has a portion with a relatively large pitch which connects pitchless portions which are located at the ends of the groove.

In another respect, the invention pertains to the configuration of a mandrel used in a bird mounting unit of the apparatus. The mandrel has a shape adapted to that of the hollow interior of a bird's body, and the improvement involves the provision on such a mandrel of a centering rib provided with a groove for receiving a bird's backbone, and a projection beside the groove for engaging a kidney space of the hollow interior of the bird's body. In connection with this feature of the invention, the mandrel is preferably mounted for pivotable movement in a vertical plane, and it is lockable in different positions. Each mounting unit has an indexing mechanism which includes an indexing plate secured to the mandrel, indexing bores formed in the indexing plate, a spring-load indexing pin which is insertable in the bores, an operating pin on the indexing pin which is engageable by operating cams on the apparatus, an adjusting mechanism including a two-armed lever which has one arm pivotably connected to the indexing plate, and both arms of the lever are provided with pins at their ends for engagement by adjusting cams located along the track. It is also preferred to construct each carrier as a flat rectangular plate with a recess for receiving a lug on a sprocket chain and also to provide each carrier with a pin which acts as a cam follower engaged by a cam surface. The plate has guide rollers on its corners for running along the track of the apparatus.

In another respect, the invention pertains to an arrangement wherein poultry processing apparatus of the known type described above includes a corner section where the carriers change their movement without bodily turning. Preferably each carrier has two oppositely facing abutment surfaces which are engageable by drive members which drive the carrier in opposite directions, and the carrier has two cam followers which are engageable by cams which drive the carrier in opposite directions. Means may be provided for moving the carriers continuously toward the corner section, and another means is provided for moving the carriers intermittently away from the corner section. The carriers are spaced from each other when they move toward the corner section, and means are provided to couple the carriers to each other at the corner section so they will be connected together as they move away from the corner section. The preferred means for moving the carriers intermittently includes a rotary cam with a forwardly facing cam surface which engages a cam follower surface on the carrier so that rotation of the rotary cam drives the carriers forwardly. In connection with such a cam arrangement, a rearwardly facing cam surface may decelerate the carriers; and, the forwardly and rearwardly facing cam surfaces converge toward each other so that they move the cam followers of adjacent carriers toward each other to engage coupling means which are mounted on adjacent carriers.

In another respect, the invention involves an improvement to the known type of apparatus described above, wherein the bird mounting means includes a mandrel which is movable between an upright position where a bird thereon is upright, a breast-up position where the bird has its breastbone facing upwardly, and a back-up position where the bird has its back facing upwardly. Means are provided for moving the carrier in opposite directions so that the bird when in its breast-up position moves in its anterior direction, and the bird when in its back-up position also moves in its anterior direction. The mandrel preferably has means for engaging at least one of the kidney spaces of a bird mounted thereon so that birds of different sizes are suitably positioned on the mandrel. A groove on the mandrel receives the backbone of the bird in order to center the bird on the mandrel; and, the mandrel also has a shoulder for engaging the anterior end of the bird's breastbone. Still another feature of the invention is an improvement to the known type of apparatus described above whereby the carriers are intermittently driven along a portion of the track by a drive means which includes a rotary cam with a forwardly facing surface for engaging cam followers on a carrier to drive the respective carrier in a forward direction, and a rearwardly cam facing surface for engaging a cam follower on a carrier to decelerate the carrier. The carriers may be provided with interengaging coupling means for holding adjacent carriers together during their intermittent movement along the track. The forwardly facing and rearwardly facing cam surfaces may be mutually convergent in order to move two adjacent carriers toward each other to engage their coupling means.

The invention also involves an improvement to the basic type of apparatus, including means for orienting the mandrel in a back-up position, means for orienting the mandrel in a breast-up position, means for removing meat from the bird when it is moving anteriorly in its back-up position, and means for removing meat from the bird when it is moving anteriorly in its breast-up position. Preferably, means are also provided for moving the mandrel to an upright position which is between the breast-up position and the back-up position. The drive means moves the mandrel at a constant velocity and in opposite directions, and the carrier changes its direction of movement without bodily turning. The mandrels may be intermittently moved from one of the drive means to the other drive means.

In another respect, the invention pertains to an apparatus for removing the leg from the body of a bird. This apparatus includes means for cutting the skin of the bird around the perimeter of the thigh, means for pivoting the thigh bone around the thigh joint to disjoint the thigh joint, means for cutting ligaments and/or tendons in the thigh joint, and means for pulling the thighs to separate them from the body of the bird. Preferably, the skin cutting means includes a first blade for cutting the skin transversely across the back of the bird's body, a second blade for cutting the skin longitudinally along the back of the bird's body, a third blade for cutting the skin along the side of the bird at the anterior edge of the thigh and a fourth blade for cutting the skin along the ventral edge of the thigh. The body of the bird is moved along a fixed path, and a preferred means for pivoting the thigh joint includes a disjointing rod which is inclined relative to the fixed path of bird movement in a direction which forces the thigh bone to pivot laterally and in a dorsal direction to disjoint the thigh joint. The means for pulling the thigh from the body preferably includes a slot which receives the bird's leg, this slot diverging from the fixed path of the bird's body so that movement of the bird's body along the fixed path moves the leg into the slot to exert pulling forces on the thigh.

The processing method according to the invention is broadly characterized as including the steps of placing a bird on a mandrel supported on a carrier, moving the carrier along a fixed path through a plurality of processing stations where meat is removed from the body while the body remains on the mandrel, and removing the entire body from the mandrel after substantially all of the meat has been removed from it. The basic improvement with respect to manual deboning lines of this type is that portions of meat are automatically removed from the body by machines while the body remains on the mandrel. In connection with this method, it is highly preferred to move the mandrel continuously through some of the processing stations and moving it intermittently through other processing stations. The direction of movement is changed without bodily turning the carrier as it moves along the path, and the mandrel is moved to different orientations relative to the carrier as it moves along the path. These different orientations include a breast-up position and a back-up position, and the mandrel may be moved in an opposite direction when in its breast up position than when it is in it back-up position. The body has its anterior end facing in the direction of movement when it is in its breast-up position, and also when it is in its back-up position.

In another respect, the invention relates to a poultry processing apparatus in which the bird's body is moved in a fixed path, and the legs but not the wings are diverted onto disjointing rods. A pair of guide rods extend in the machine direction and they are positioned to lie on opposite sides of the bird's body with the legs and wings lying outboard of the guide rods. Each guide rod has a raised portion for lifting the wings and legs as they move therealong so that the wings and legs move along respective raised paths. A pair of disjointing rods are spaced from the raised paths of the wings, but these disjointing rods lie in the raised paths of the legs so that the legs but not the wings move into contact with the disjointing rods. The disjointing rods are inclined relative to the fixed path of the bird's body so that the disjointing rods pivot the thigh bones about the thigh joints to disjoint the thigh joints. The thighs are subsequently separated from the bird.

Additionally, a feature of the invention pertains to the actuation of a tendon cutting blade which cuts the thigh joint ligaments and/or tendons. In order to prevent this blade from acting on the wings, breasts, or other parts of the birds, actuating means are operable each time a bird moves through the apparatus to move the tendon cutting blade from a retracted position where it is outside the path of the bird to a cutting position which cuts the ligaments and/or tendons of the thigh joint.

The invention may be practiced in many different ways, exemplary embodiments of which are shown in the drawings and described in the detailed description.

DETAILED DESCRIPTION OF A PREFERRED EMBODIMENT

The Transport System

Figure 1:
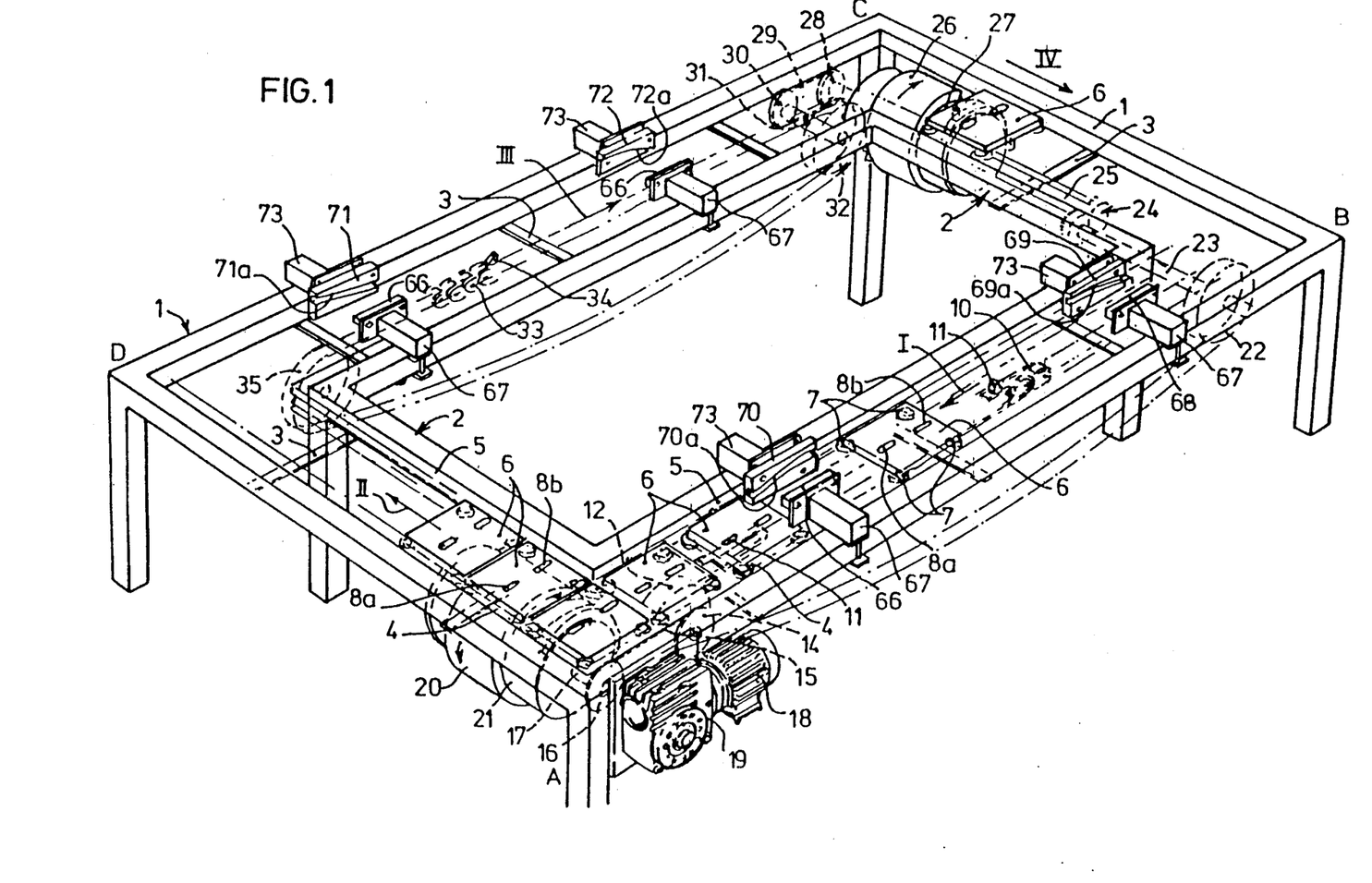
FIG. 1 is a perspective view of the transport system constructed to the invention.
Figure 2:
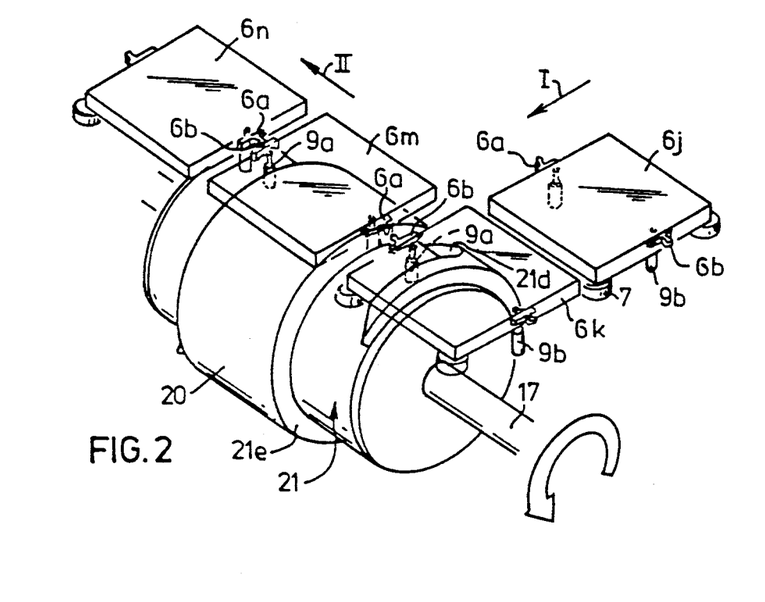
FIG. 2 is a schematic perspective view showing the components that couple adjacent transport carriers and intermittently drive the coupled carriers in a forward direction.

The apparatus according to FIGS. 1 and 2 is provided with a table-shaped rectangular outer frame 1, and with a likewise table-shaped rectangular inner frame 2. These frames have the same height, their upper faces are in one flat plane, and they are equally spaced from each other along the entire circumference of the apparatus. The frames 1 and 2 are connected together by spaced cross connections 3 along the circumference so they form a rigid entity. The frames 1 and 2 may be square tubes of stainless steel welded to each other.

Rails 4 and 5 are provided at the inside of the outer frame 1 and the outside of the inner frame 2. These rails 4 and 5 form a rectangular track along which carriers 6 are movable. The corners of this track are designated A, B, C, and D. The carriers 6 are mounting plates for bird-holding units which are described later in this specification.

Along the side A-B of the frame 1, there is a driving chain 10 with pusher lugs 11 which engage front recesses 8a of the carriers 6 in the direction of movement I. The carriers 6 are moved by the chain 10 and the lugs 11 in such a way that adjacent carriers 6 are spaced apart a suitable distance in the direction of movement. The chain 10 adjacent to the corner A runs over a sprocket 12 fixed on an intermediate axle (not shown), to which a second sprocket 14 is secured. A chain 15 engages the sprocket 14 and a sprocket 16 on an axle 17, which is journalled parallel to the side A-D of the frame 1.

The chain 10 at some distance from the sprocket 12 runs over a supporting guide (not shown) which is adjustable longitudinally of the chain 10, which holds the chain at an elevation where its lugs 11 are positioned in recesses 8a of the carriers 6. This guide lies higher than a horizontal line through the highest point of the sprocket 12. Adjustment of the guide makes it possible to set the point where the lugs 11 leave the front recesses 8a in the carriers 6 and consequently do not move the carriers any further.

At the side A-B of the frame 1, a motor 18 and a reduction gear box 19 are mounted. The output shaft of gear box 19 is coupled with the axle 17 and drives it continuously. Through the axle 17, the sprocket 16, the chain 15, the sprocket 14, the intermediate axle and the sprocket 12, the chain 10 with the lugs 11, and consequently the carriers 6, are driven continuously in the direction of the arrow I.

Figures 4, 5, 6, 7, 8:
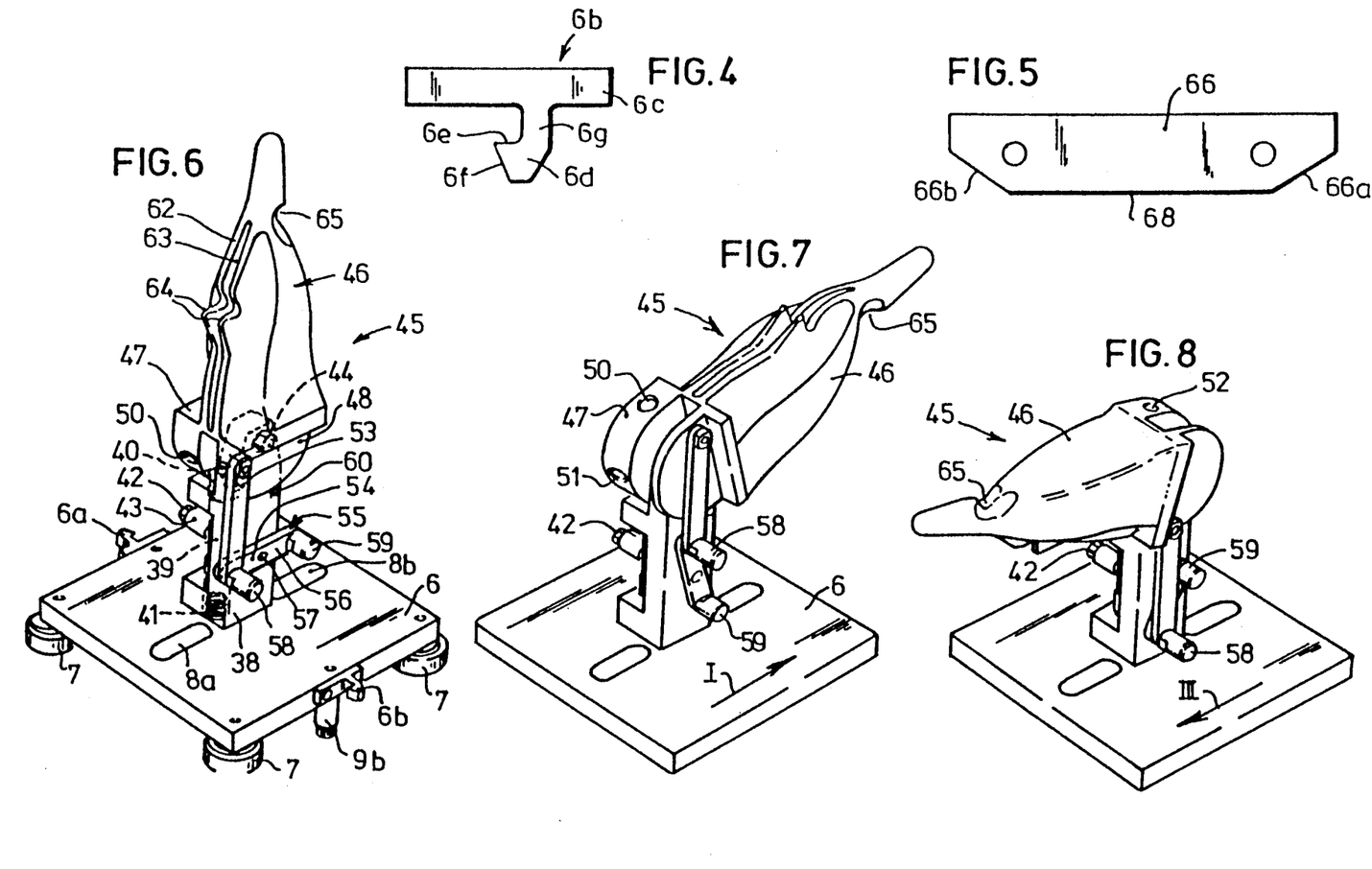
FIG. 4 is a top view of a coupling member used in the apparatus according to the invention.
FIG. 5 is an elevational view showing the shape of the operating cam which unlocks the mandrel-indexing mechanism.
FIG. 6 is a perspective view showing a carrier, a bird-holding mandrel, and the mechanisms which mount the mandrel on the carrier.
FIG. 7 shows the device of FIG. 6 wherein the mandrel is reoriented at a position where the back of the bird will face upwardly.
FIG. 8 shows the device of FIG. 6 wherein the mandrel is reoriented at a position where the breast of the bird will face upwardly.

A carrier 6 is shown in greater detail in FIG. 6 where it can be seen that it is a flat rectangular plate having guide rollers 7 mounted on its four corners for engaging the tracks 4 and 5. Elongated recesses 8a and 8b extend through the entire thickness of the plate. The ends of these recesses serve as abutment surfaces which are engageable and movable by pusher lugs 11 and 34 on drive chains 10 and 33 for continuous movement. The plate is provided with depending cam follower pins such as 9b which are more specifically described below in connection with FIG. 2.

Each of the carriers 6 is provided with disengageable couplings 6a and 6b which engage similar couplings on adjacent carriers. The couplings become engaged when the carriers are in corner A and corner C, so the carriers 6 moving from A to D and from C to B will all be connected together.

The couplings 6a and 6b are formed of a material such as nylon which has sufficient rigidity for strength and suitable resilience for the latching action described below. As shown in FIG. 4, each coupling has a base 6c for attachment to the carrier 6, a head 6d with an inwardly facing latching surface 6e and an outwardly facing oblique deflector surface 6f, and a neck 6g which connects the head to the base. The positions of the connectors and the physical properties of the nylon are such that when two adjacent carriers are forced together, the deflector surfaces 6f will force the heads 6d laterally to flex the resilient necks 6g until the heads 6d pass each other. The resilience of the necks then causes the heads to return to their unflexed positions so that the latching surfaces 6e face each other to retain the couplings and their respective carriers together. At corners D and B, movement of a leading carrier in the direction of arrows III and I will disengage the couplings.

FIG. 2 shows four carriers 6j, 6k, 6m, and 6n in the vicinity of corner A of the rectangular track. The carrier 6j has traversed the side B-A of the track at a constant velocity, and it is approaching the corner A. Carrier 6k is at the corner A, and the three carriers 6k, 6m, 6n are stationary. Each of the carriers has cam follower pins 9a and 9b depending from its lower surface. During movement of the carriers in the direction of arrow II, pins 9a are the leading pins, and pins 9b are the trailing pins.

Figure 3:
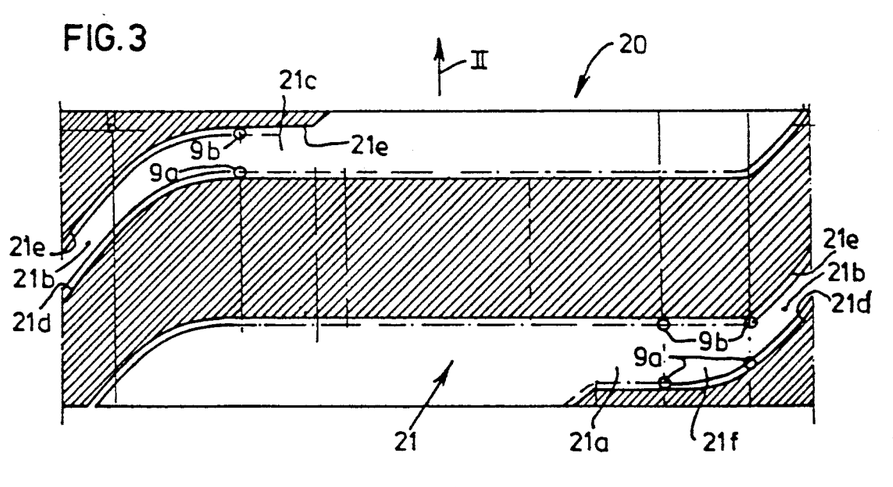
FIG. 3 shows the shape of the groove of the cam illustrated in FIG. 2.

The pins 9a and 9b extend into a groove 21 formed in the outer surface of a cylindrical drum 20. The laid-out shape of this groove is shown in FIG. 3. It has a pitchless entry section 21a and a pitchless exit section 21c, connected together by a carrier-driving section 21b which has a relatively large pitch. The groove 21 forms a forwardly facing cam surface 21d which engages the forward cam followers 9a so that continuous rotation of the cam drum 20 will intermittently drive the cam followers 9a and their respective carriers in the forward direction represented by the arrow II. The rear facing surface 21e of the groove 21 engages the rear cam follower pins 9b of the carriers 6 to decelerate the carriers 6 and to prevent any inertial forward movement thereof. Thus, when a rear cam follower 9b approaches the pitchless exit section 21c of the cam groove 21, the surface 21e decelerates the cam follower 9b, its respective carrier and all other carriers which are coupled together.

As shown in FIG. 2, the trailing cam follower 9b on carrier 6m and the leading cam follower 9a on carrier 6k are both located in the entry section 21a of the cam groove where they are engageable respectively by the surfaces 21e and 21d. Their positions in the groove 21 are also shown diagrammatically in FIG. 3 where it can be seen that the groove has a coupling section 21f where the surfaces 21d and 21e converge toward each other in an axial direction. Due to this convergence, the adjacent pins and carriers are forced toward each other so that their couplings 6a and 6b engage. In FIG. 2, the couplings 6a and 6b of carriers 6m and 6n have been engaged in this manner. As the cam 20 continues its rotation, the carriers intermittently move forwardly as their cam follower pins move through the driving section 21b of the groove 21, and then they decelerate as the trailing pin 9b on the leading carrier follows the rear facing surface 21d of the cam groove 21.

Returning to FIG. 1, it will be seen that the chain 10 adjacent to the corner B of the frame 1 runs over a sprocket 22 which is secured on an axle 23 which is journalled parallel to the side B-C of the frame 1. The axle 23, at its end opposite the sprocket 22, is connected to a reversing device 24, which has its output axle 25 driven in an opposite direction to the axle 23. On the driven axle 25, there is a driving drum 26 with a cam groove 27 secured parallel to the side B-C of the frame 1. The construction and shape of the driving drum 27 corresponds with that of the driving drum 20 in the corner A of the frame 1. On the driven axle 25, there is a sprocket 28, over which a chain 29 is running. The chain 29 also runs over a sprocket 30 which is secured on an intermediate axle 31 journalled on the frames 1 and 2. At the other side, on the intermediate axle 31, a sprocket 32 is secured. This sprocket carries a driving chain 33 which has lugs 34. Near corner D, the chain 33 is supported by an idler sprocket 35. The driving chain 33 runs parallel to the side C-D of the frame 1, and its upper run moves in the direction of the arrow III.

At some distance from the sprocket 32, the chain 33 is supported by a guide (not shown) which is adjustable in the longitudinal direction of the chain 33. This guide lies higher than a horizontal line between the highest points of the sprockets 32 and 35. Repositioning of the guide makes it possible to set the point where the lugs 34 leave the recesses 8b so they do not drive the carriers any further.

The operation of the above-described apparatus, starting from the corner point B of the frame 1, is as follows:

The carrier 6, which is in the corner B of the frame 1, is pushed by a lug 11 of the chain 10, which engages the forward recess 8a in the carrier 6. The carrier 6 is thus moved in the direction of the arrow I along the side B-A of the frame 1. The first carrier 6 is carried by the lug 11 until it is a certain distance from the corner A, after which the lug 11 moves out of the recess 8a. The carrier 6 then remains at that point, until it is moved by subsequent carriers 6 as far as possible in the direction of the arrow I. After the mentioned first carrier 6 reaches the corner A, the cam surface 21d on the driving drum 20 engages its front cam follower pin 9a. The drum 20 moves carrier 6 over a distance which is approximately equal to the length of the carrier 6 parallel to the side A-D in the direction of the arrow II in FIG. 2. The coupling 6a is coupled with the rear coupling of a preceding carrier. The next carrier 6 and the following carriers, which are brought to the corner A of the frame 1 by the chain 10 and the lugs 11, are transported afterwards also over the same distance as the above-mentioned carrier 6 by the drum 20 and the groove 21, so that all carriers 6 on the path A-D are intermittently transported over this distance in the direction from A to D.

Soon after the above-mentioned first carrier 6 arrives in the corner D of the frame 1, it is engaged and carried by lug 34 of the driving chain 33 and transported in the direction of the arrow III (FIG. 1) to the corner point C of the frame 1. The lug 34 engages the front recess 8b of the carrier 6. The carriers 6 are transported over the path from D to C in the direction of movement III with the same mutual distance as over the path from B to A.

Also on the path from D to C, the carriers 6 will stop at a certain distance from the corner point C of the frame 1 because the lug 34 of the driving chain 33 moves out of the front recesses 8b of the carriers 6. Subsequently, the carriers 6 are displaced one by one as far as possible in the direction of the arrow III by the following carriers, until they are queued in the corner C of the frame 1.

Shortly after the above-mentioned carrier 6 has arrived in the corner C, the driving surface of groove 27 on the driving drum 26 engages the front carrier pin 9b in the direction of movement IV, and the carrier 6 is moved over a distance equal to the length of the carrier in the direction of movement III. Couplings 6a and 6b of adjacent carriers are connected together, and the carriers are moved intermittently to the corner point B of the frame 1. All carriers in the path from C to B are displaced over the same distance to the corner point B. In this way the above-mentioned first carrier 6 returns to its starting point in the corner B of the frame 1 and the cycle starts again.

From the above it follows that on the paths from B to A and from D to C according to the arrows I and III, continuous constant velocity movement of the carriers 6 takes place in opposite directions: and, on the paths !rom A to D and from C to B, stepwise or intermittent movement takes place in opposite directions.

The Mandrel Assembly

Features of the bird mounting units are shown in FIGS. 6-11. Referring to FIG. 6, it will be seen that an indexing pin 39 with a smaller top end 40 is mounted on a base 38 on the base plate of carrier 6. In the bore for the indexing pin 39, a compression spring 41 is retained beneath the pin to bias the pin 39 constantly upwardly. A lateral operating pin 42 with a free rotatable roller 43 is fixed on the indexing pin 39.

A mounting unit 45 is supported pivotably on the base 38 by an axle 44. The mounting unit includes a-mandrel 46, an indexing plate 47 and an operating plate 48. The indexing plate 47 has three indexing bores 50, 51, and 52, the angular distance between the bores 50 and 51 and between the bores 51 and 52 being about 75 degrees.

In the positions of the mounting unit 45 shown in FIGS. 6, 7, and 8, the upper end 40 of the indexing pin 39 engages in the indexing bores 51, 52, and 50 respectively. The mounting unit 45 successively stands substantially vertical as shown in FIG. 6; it is tilted one direction as shown in FIG. 7; and, it is tilted the opposite direction as shown in FIG. 8 by an angle of about 75 degrees.

A rod 53 is pivotably mounted on the operating plate 48. This rod is pivotably connected with one arm 54 of a two-armed lever 55. The other arm of this lever is designated 56. The lever 55 is pivotably mounted on the base 38 by a journal 57. The ends of the lever arms 54 and 56 are provided with free rotatable pins 58 and 59, respectively, which may be roller pins. The free end of the pin 58 protrudes farther from the lever 55 than the pin 59. On the base 38, there is a stop pin 60 which serves as a stop for the rod 53, both in the back-up tilted position (FIG. 7) and in the breast-up tilted position (FIG. 8) of the mounting unit 45 to prevent the unit 45 from revolving too far.

Figure 9:
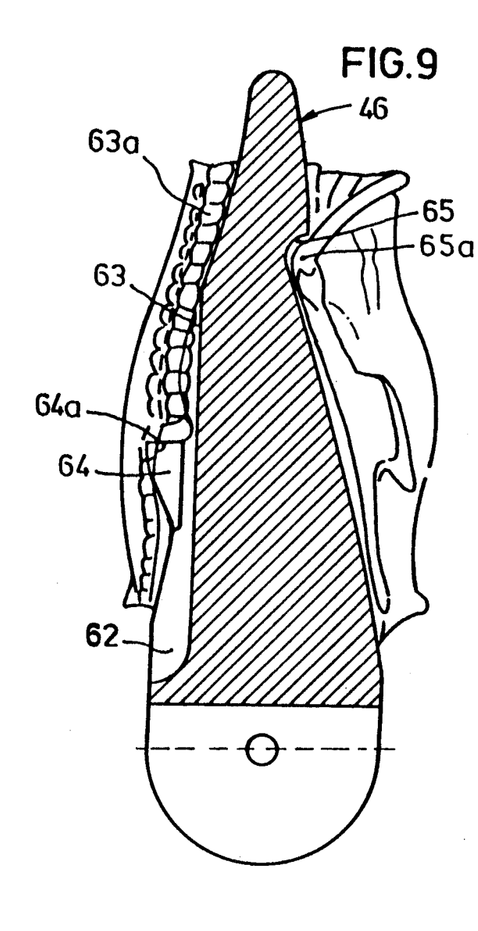
FIG. 9 is a sectional view showing the relationship between the mandrel surfaces and the bird's anatomy.

The outer form of the bird-supporting mandrel 46 is adapted to the shape of the hollow interior of the body of a bird. At the backside, the mandrel is provided with a centering rib 62, in which a groove 63 is formed to receive the backbone 63a of a bird as shown in FIG. 9.

According to the invention, the mandrel has projections 64 which engage into the kidney spaces 64a of the birds placed on the mandrel 46. These projections 64 and the groove 63 serve to fix the birds and center them in three directions, so that the birds take an optimal position for the treatment and work to be done.

To hold the birds on the mandrel 46 in an axial direction, a recess 65 is formed at the front side of the shaped body 46 adjacent to the free end of the mandrel. This recess forms a shoulder for engaging the anterior end 65a of the bird's breastbone.

Bird Orienting Mechanisms

As shown in FIG. 1, at the side B-A of the outer frame 1 and also on the side D-C of the inner frame 2, operating cams 66 are mounted for actuating the indexing mechanism of the mounting unit 45. These cams are secured to the frame beams by holders 67.

As shown in FIG. 5, the operating cams 66 are provided with inclined planes 66a and 66b inclined about 30 degrees with respect to the horizontal, with a horizontal operating plane 68. The operating cams 66 may be manufactured of metal, synthetic material or other wear-resistant material.

Directly opposite the operating cams 66 at the side B-A of the inner frame 2 and the side D-C of the outer frame 1, four adjusting cams 69, 70, 71 and 72 are mounted. These adjusting cams are secured to the frame girders by holders 73. The adjusting cams 69, 70, and 71 are blocks of metal, synthetic material or other wear-resistant material, in which groove-shaped cam tracks 69a, 70a and 71a respectively are milled. The cam 72 also is a block of metal, synthetic material or similar material, which has a thickened part having a cam track 72a at its bottom side.

The function and operation of the operating cams 66 and the adjusting cams 69, 70, 71 and 72 will now be further elucidated.

At the beginning of the path from B to A, while moving in the direction of the arrow I, the mounting units 45 are substantially vertical and their indexing pins 39 are engaged with the indexing bore 51. When approaching the adjusting cam 69, the pin 58 moves into the curved track of cam 69, and the roller 43 runs up the rising plane 66a and onto the operating plane 68 of the operating cam 66, so that the indexing pin 39, 40 releases the index plate 47 and consequently the mounting unit 45. Then the pin 58 is pushed upwardly by its movement in the cam track 69a, so that the mounting unit 45 tilts forwardly from the vertical position over an angle of about 75 degrees to the back-up position shown in FIG. 7, after which the roller 43 runs from the operating cam track via the descending plane 66b. The indexing pin 39, 40 extends into the bore 52, thereby locking the mounting unit 45 again. Between the adjusting cams 69 and 70, while moving in the direction of the arrow I, the birds travel in an anterior direction in a back-up position so the desired treatments and/or workings may be performed.

When the carrier approaches the adjusting cam 70, the pin 58 first moves into the cam track 70a. The operating cam 66 at this location releases the unit 45 as described above, and the cam track 70a pushes the pin 58 gradually downwardly to pivot the mounting unit 45 to the vertical position shown in FIG. 6. The operating cam 66 then releases the indexing pin 39, 40, which enters the bore 51 so that the mounting unit 45 is fixed again.

During movement of the carriers 6 over the remaining part of the path from B to A in the direction of the arrow I, over the path from A to D in the direction of the arrow II, and over the first part of the path from D to C in the direction of the arrow III, the mounting unit 45 remains substantially vertical as shown in FIG. 6.

When it approaches the adjusting cam 71 in the direction of the arrow III, the pin 58 first moves into the curved track 71a. Subsequently, the index pin 39, 40 is retracted by the operating cam 66 to release the mounting unit 45. The cam track 71a pushes the pin 58 downwardly, causing the mounting unit 45 to pivot 75 degrees from the vertical position shown in FIG. 6 to the breast-up position according to FIG. 8. The index pin 39, 40 is released by the operating cam 66 and it enters the bore 50 so that the mounting unit 45 is locked in the position shown in FIG. 5.

Between the adjusting cams 71 and 72 the birds travel headfirst in the direction of the arrow III with their breasts upwardly to facilitate the required treatments of and workings on the birds.

During the movement of the mounting unit 45 in the direction of the arrow III toward the adjusting cam 72, the pin 58 of the operating mechanism is in its lowest position, so that it moves under the adjusting cam 72. The pin 59, being in the highest position, runs on the cam track 72a. Then, the indexing pin 39, 40 is retracted from the indexing bore 50 in the indexing plate 47 by the operating cam 66 to release the mounting unit 45. The pin 59 runs further on the cam track 72a and is thereby pushed downwardly so far, that the mounting unit 45 is tilted from the position of FIG. 8 over an angle of 75 degrees into the vertical position shown in FIG. 6. The operating cam 66 again releases the indexing pin 39, 40 so it enters the indexing bore 51.

During the movement of the mounting unit 45 over the remaining part of the path from D to C in the direction of the arrow III and over the path from C to B in the direction of the arrow IV, the mounting unit 45 remains substantially in the vertical position shown in FIG. 6, and it is then returned again to the starting point in the corner B of the frame 1.

Working/Treatment Means

The transport system is associated with stations where operations are performed on the birds in order to remove substantially all of the meat from the body so that only the skeletal structure of the body remains on the mandrel when the bird completes its travel around the rectangular track.

The two principal workings/treatments performed on the birds are (1) the removal of the legs from the bird's body, and (2) the removal of the wing/breast pieces from the bird's body. In this context, the term "body" refers to the skeletal structure of the bird's torso.

Generally speaking, the leg removal procedure involves the preliminary cutting of the skin around the entire perimeter of the thigh meat, where it joins the body, extending the thigh bone to disjoint the thigh joint (i.e., the joint which connects the thigh bone to the body), cutting any ligaments and/or tendons in the thigh joint, and then pulling of the leg from the body of the bird. These steps are performed along the intermittent moving side C-B and the continuous moving side B-A of the rectangular track.

Figure 12:
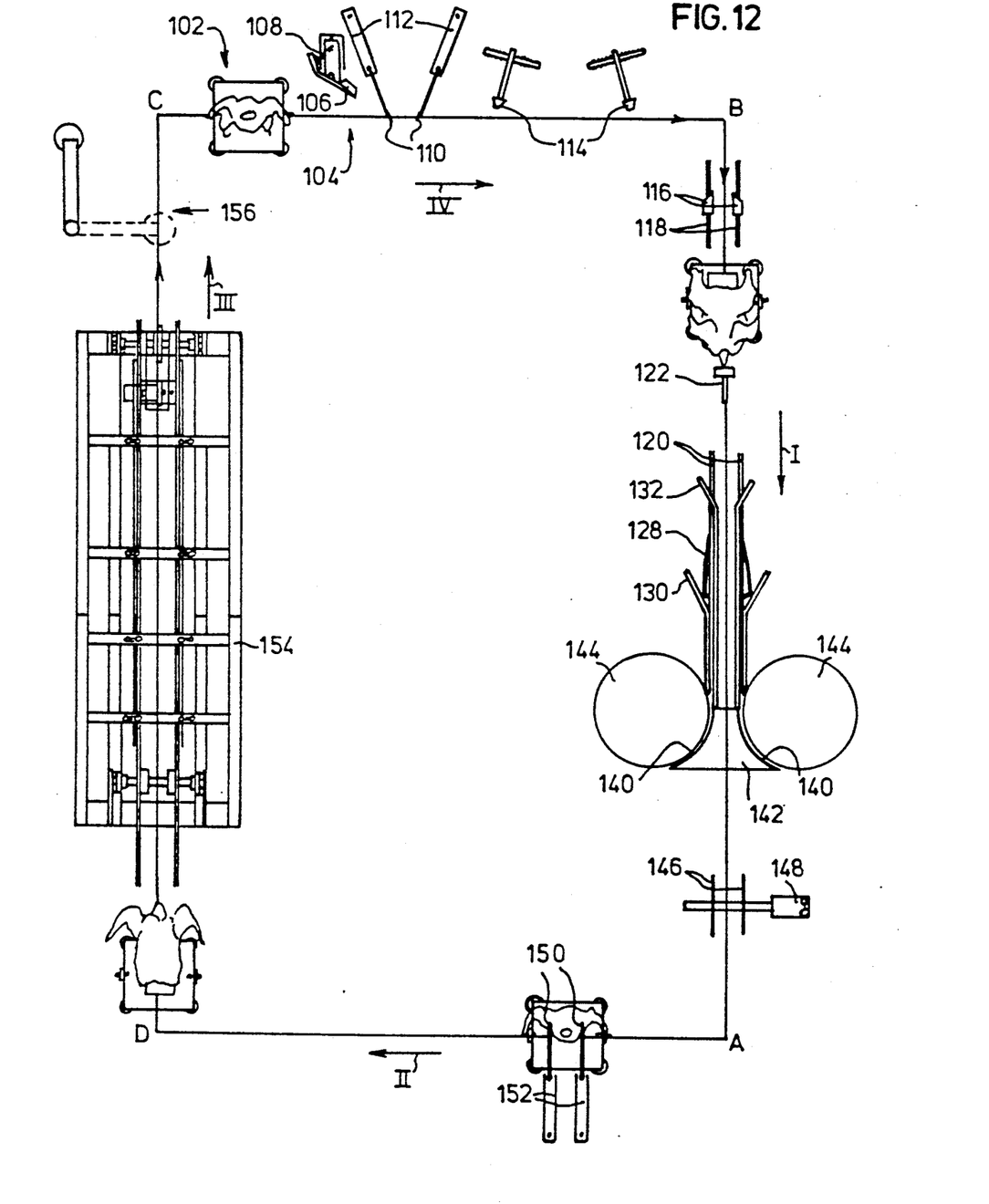
FIG. 12 is a diagrammatic plan view showing various mechanisms for operating on the birds as they travel along their rectangular path.

As shown in FIG. 12 chilled, dressed, eviscerated birds which have had their tails cut off are loaded on the mandrels at station 102. Workers standing outside the rectangular transport system manually place the birds on the mandrels carefully, positioning each bird on a mandrel 46 until the projections 64 of the mandrel engage the kidney spaces of the birds. By so positioning the birds, it is possible to process birds of diverse sizes in the apparatus.

At the subsequent station 104, a skin cut is made transversely across the bird's back at the anterior edge of the thigh. This cut may be made by a pivotably mounted blade 106 biased by a spring 108 toward the path of the bird so that this cut will be made during the intermittent movement of the bird. At a station where the bird is stationary, the skin across the lateral anterior edges of the thighs is cut by blades 110 which are moved linearly by pneumatic cylinders 112. At later stations where the bird is stationary, tools 114 enter the previous incisions and release the oyster meat from the body so that the oyster meat will remain with the thigh when the thigh is removed.

At corner B, the carrier 6 changes it direction of movement from direction IV to direction I. This directional change occurs without any turning movement of the carrier 6 or mandrel. As described in connection with FIG. 1, a lug 11 on the chain 10 rises into the forward opening 8a and engages the forward surface thereof to propel the carrier 6 in the direction I at a constant velocity. The mandrel is unlocked from its upright indexed position by cam 66 and moved by cam 69 from the upright position to a head-forward, back-up position.

At sequential stations along the side B-A, the skin is cut along the ventral edge of the thigh, the skin is optionally cut longitudinally at the spine between the thighs, the thighs are lifted to disjoint the thigh joints, the tendons and/or ligaments associated with the thigh joints are cut, and the legs are pulled to separate them from the bird's body. All of these operations are performed while the bird is advancing at a constant velocity in an anterior direction and in its back-up position.

The skin is cut along the ventral edge of the thighs by two stationary skin cutting blades 116 mounted on longitudinal horizontal guide rods 118 which lie on opposite sides of the bird's breast. These blades 116 lie in planes which are inclined upwardly and inwardly, and their cutting edges which lie in the path of the birds are inclined upwardly and rearwardly relatively to the machine direction. The blades are positioned so that, at the moment the bird arrives at its back-up position, the blades 116 will be behind the wings and in front of the thighs. The blades are also positioned so that they cut the skin but not the meat because, if the meat is cut, some thigh meat will remain on the body when the thigh is pulled from the body.

Figure 13:
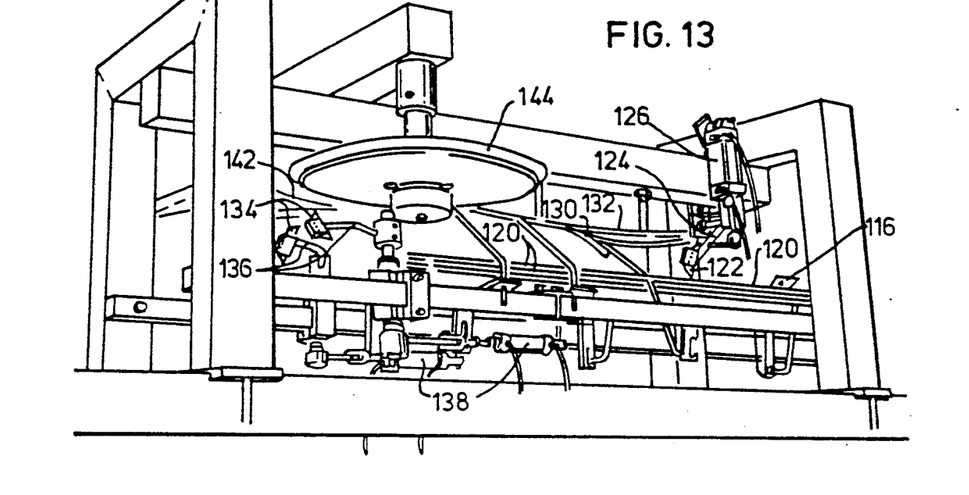
FIG. 13 is a perspective view of the principal structure of the leg removing apparatus.
Figure 14:
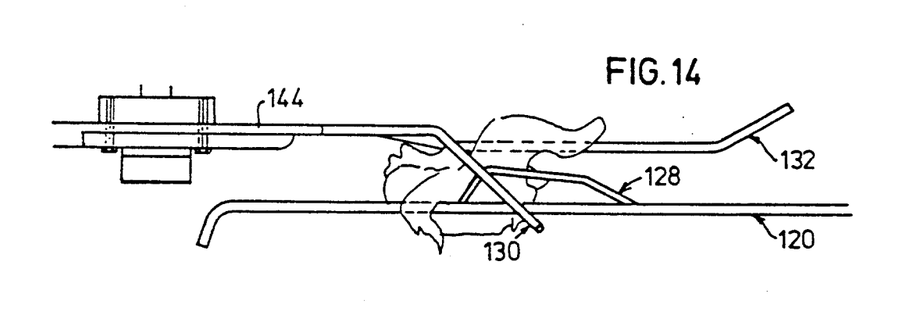
FIG. 14 is a side view of the thigh disjointing and removing elements of the leg-pulling apparatus.
Figure 15:
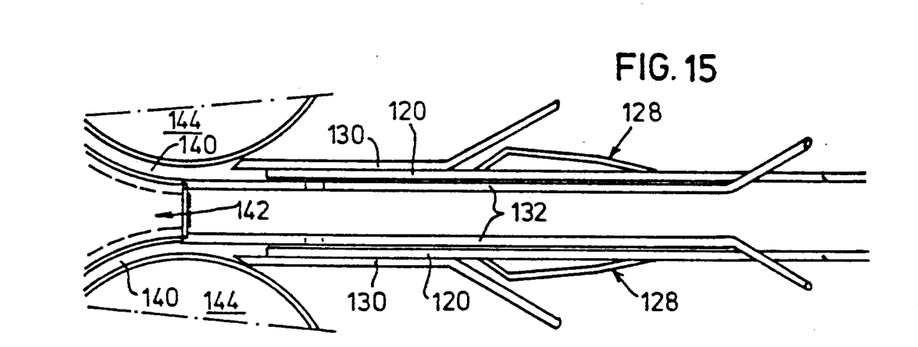
FIG. 15 is a plan view of the thigh disjointing and removing elements of the leg-pulling apparatus.

The apparatus for making the final skin cut and completing the leg removal operations along side B-A is shown in FIGS. 13, 14, and 15. This unit includes two horizontal rods 120 which are positioned so that the bird's body will lie between them, and the bird's wings and legs will hang laterally outside of them.

The skin is cut longitudinally along the spinal column of the bird in the thigh area by a blade 122 which is mounted on a swinging rod 124. A pneumatic cylinder 126 is operatively connected to the rod in order to produce the pivoting action which brings the blade 122 into contact with the bird at a time and position so as to cut the backskin along the spinal column between the two thighs, thus completing the skin cut around the perimeter of the thigh in preparation for the leg pulling operation.

Figure 10:
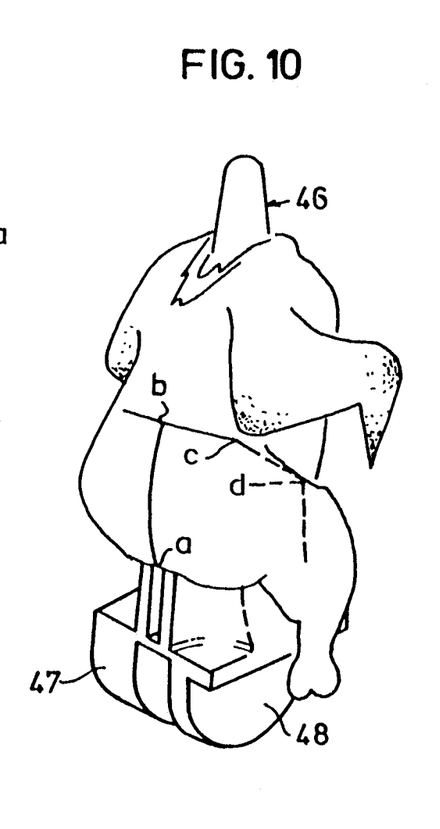
FIG. 10 is a perspective view showing a bird mounted on the mandrel and showing the location of cuts which are made in the bird's skin prior to pulling the leg therefrom.
Figure 11:
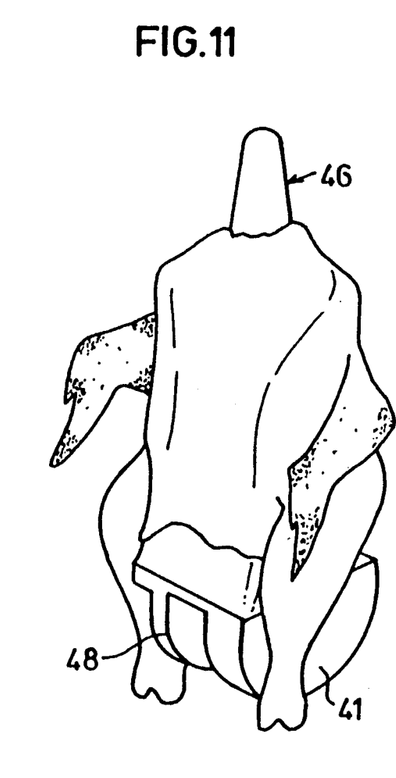
FIG. 11 is a front perspective view of a bird mounted on the mandrel.

The approximate locations of the skin cuts around the thigh are shown in FIG. 10. The longitudinal cut along the back of the body from a to b is made by the blade 122; the transverse cut along the back from b to c is made by the blade 106; the cut along the side of the bird at the anterior edge of the thigh from c to d is made by the blade 110; and, the cut along the ventral edge of the thigh from d to the body's mandrel-receiving opening is made by the blade 116.

Figure 17:
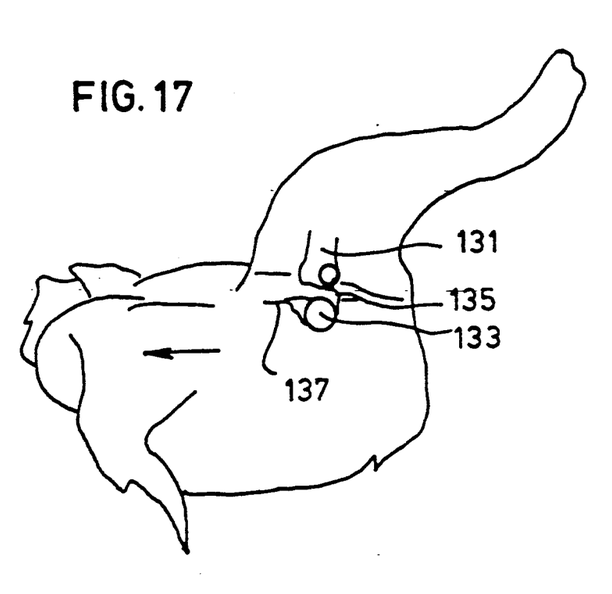
FIG. 17 is a side view of a bird showing the disjointed thigh joint and the location of the cut formed by the tendon cutter.

As shown in FIG. 14, the bird's wings and thighs are raised by upwardly and outwardly inclined lifter rods 128 attached to the rods 120. This causes the wings and thighs to move along respective raised paths. A pair of disjointing rods 130 are spaced from the raised paths of the wings, but these rods 130 lie in the raised paths of the thighs. Thus, the wings pass beneath the leading ends of the thigh disjointing rods 130, but the position and size of the thighs is such that they ride above and onto the disjointing rods 130 and into the convergent infeed ends of guide slots formed by the disjointing rods 130 and guide rods 132. The disjointing rods 130 raise the thighs, pivoting the thigh bones about their joints until the thigh bones are substantially vertical. After rotating about 50 degrees, and as shown in FIG. 17, the bone 131 pops from its socket 133, thus disjointing the thigh and exposing tendons and/or ligaments in the thigh joint areas as shown in FIG. 17. The principal tendon, tendo muscullus obturatorii, is shown at 135. At this point, the thigh bones have progressed into sections of the guide slots where the rods 130 and 132 are parallel in order to guide the thighs along precisely defined longitudinal paths. The spacing between the rods 130 and 132 is such that the enlarged distal end of the thigh bone 131 is captured above the rods 130 and 132. Initially, the guide slot formed by the rods 130 and 132 ascends in the machine direction to apply tension to the thigh bone 131, pulling it up to hold the ball of the thigh joint away from the socket 133 as shown in FIG. 17. Thereafter, the guide slot becomes horizontal and aligned with the upstream end of the slot 140.

Figure 16:
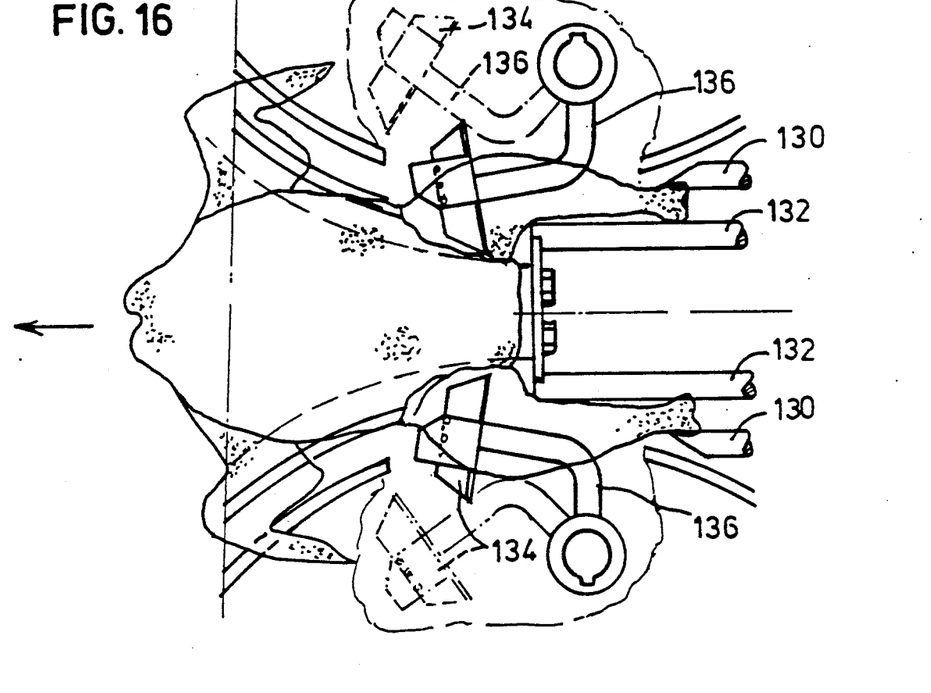
FIG. 16 is a plan view showing the retracted and cutting positions of the tendon cutter.

The tendons and/or ligaments are cut along the line 137 in FIG. 17. The mechanism for forming this cut is shown in FIGS. 13 and 16. It has blades 134 on pivoted arms 136 which are activated by pneumatic cylinders 138. These blades are normally in the retracted positions shown in broken lines in FIG. 16 so they are not in the path of the wings, breasts or other parts of the approaching birds. When the wings and breasts pass beyond the blades 134, the cylinders 138 are actuated to move the arms 136 and blades 134 to their operative cutting positions shown by solid lines in FIG. 16. When in their cutting positions, the blades are inclined upwardly and inwardly about 15 degrees and, due to the birds' movement, they form the longitudinal cuts 137 in the opposite sides of the bird.

The legs then enter two slots 140 formed between a generally triangular stationary member 142 and a pair of idler discs 144. These slots 140 diverge laterally from the bird's path of movement and from each other, and their elevation is such that the bird's knee joint will be above the narrowest parts of the slots 140. The legs are held in these slots, so continued forward movement of the bird's body will pull the legs to separate them completely from the bird's body. The legs accumulate in the slots 140, with their drumstick portions lying on the upper surfaces of the discs 144 and their thigh portions dangling around the perimeters of the discs 144. This completes the leg-removal operation.

The bird then progresses through a breast removal process which is known in the art and described in U.S. Pat. No. 4,873,746 granted on Oct. 17, 1989, to Donald J. Scheier, now owned by Johnson Food Equipment, Inc. The entire contents of this patent are incorporated herein by reference.

While the bird is still moving at a constant velocity in a back-up orientation along the side B-A of the track, circular blades 146 driven by a motor 148 make preliminary cuts into the wing joints, i.e. the joints which connect the wings to the bird's body.

After passing the blades 146, the mandrel is pivoted to its upright position by the cam 70 as previously described. The carrier 6, mandrel 46, and the bird then move continuously to the corner A, and intermittently from corner A along the side A-D of the rectangular path.

At a station where the bird is stationary during its travel from A to D, the wings are pulled laterally to expose and separate the wing joints, and reciprocating cutting blades 150 operated by pneumatic cylinders 152 cut the exposed joints to complete the wing joint separation and to sever the tendons and/or ligaments associated with the wings. After these operations are performed, the wing remains attached to the breast, but not to the bird's body.

In corner D, a lug 34 on the chain 33 enters the opening 8b in the carrier 6 to drive the carrier, mandrel and bird at a constant velocity from corner D to corner C. The cam 71 tilts the mandrel 46 so that the bird will then move in an anterior direction and in a breast-up orientation to facilitate the breast removal step described in the above-mentioned U.S. Pat. No. 4,873,746. An optional longitudinal cut can be made if the bird's two breasts are to be separate. A preliminary cut is made in the anterior end of the bird, between the breast fillet and the body. In the breast puller unit 154, each of the wings is lifted by a guide bar and engaged between the guide bar and a chain which moves in a divergent path from or more slowly than the mandrel and bird, so the wings are pulled away from the body. Since the wings are connected to the breasts, this pulls the breast meat from the carcass so that the wing/breast portions are removed together. The breast tenderloin may remain on the carcass for subsequent manual o automatic removal. The carrier then moves past the cam 72 where it is returned to its upright position !or unloading at station 156. The spent body is removed from the mandrel, and the mandrel returns to the loading station where it can receive another bird to be processed.

The foregoing specification has described a presently preferred embodiment of the invention. Persons familiar with poultry processing will recognize that it is susceptible to many modifications, variations and improvements. Therefore, it is emphasized that the invention is not limited to the apparatus and methods disclosed herein, but is embracing of many other embodiments which may fall within the spirit of the following claims.

We claim:

1. In a poultry processing apparatus for transporting and operating on eviscerated birds comprising,
   a track;
   a plurality of carriers which are engaged with said track for movement therealong;
   a plurality of bird mounting units supported on said carriers;
   processing means located along said track for performing operations on birds on said mounting units; each said mounting unit including a mandrel having an anterior end and a shape adapted to that of the hollow interior of a bird's body;
   the improvement wherein said mandrel has a centering rib provided with a groove for receiving a bird's backbone, said mandrel also having a projection beside the groove for engaging a kidney space of the hollow interior of a bird's body,
   said projection being inclined in a direction toward the anterior end of the mandrel.

2. Apparatus according to claim 1, wherein the mandrel is pivotably mounted for movement in a vertical plane and is lockable in different positions.

3. Apparatus according to claim 1 wherein each bird mounting unit has an indexing mechanism including an indexing plate secured to the mandrel, a plurality of indexing bores formed in said indexing plate, a spring-loaded indexing pin which is insertable in said bores, an operating pin on said indexing pin which is engageable by operating cams located along the track, each bird mounting unit having an adjusting mechanism including a two-armed lever, a rod pivotally connecting one arm of said lever with the indexing plate, both arms of said lever being provided with pins at their ends for engagement with adjusting cams located along said track.

4. Apparatus according to claim 3, wherein said carrier is a flat rectangular plate provided with at least one recess for receiving a lug on a sprocket chain, each carrier having at least one pin which is engageable by a cam surface, said plate having guide rollers on its corners for running along on the track of the apparatus.

5. In a poultry processing apparatus for transporting and operating on eviscerated birds, comprising,
a track;
a plurality of carriers which are engaged with said track for movement therealong in a direction of travel;
a plurality of bird mounting units supported on said carriers;
processing means located along said track for performing operations on birds on said mounting units; wherein said bird mounting means includes a mandrel shaped to enter and securely hold a bird which has a body with an internal kidney space, a breastbone, a backbone and a back;
said mandrel being mounted for movement in a plane which is parallel to said direction of travel between an upright position where a bird thereon is upright, a breast-up position where a bird thereon has its breastbone facing upwardly, and a back-up position where a bird thereon has its back facing upwardly.

6. Apparatus according to claim 5 having means for moving said carrier in opposite directions to move the bird in its anterior direction when the mandrel is in its breast-up position, and to move the bird in its anterior direction when the mandrel is in its back-up position.

7. Apparatus according to claim 5 wherein mandrel has projection means for engaging at least one of the kidney spaces of a bird mounted thereon so that birds of different sizes are suitably positioned on the mandrel.

8. Apparatus according to claim 5 wherein said mandrel has a groove positioned to receive the backbone of a bird mounted thereon so as to center the bird on the mandrel.

9. Apparatus according to claim 5 wherein said mandrel has a shoulder for engaging the anterior end of the breastbone of a bird mounted thereon.

10. Apparatus according to claim 5 wherein said mandrel has the following:
a groove for receiving the backbone of a bird mounted thereon;
at least one projection means for engaging at least one of the bird's kidney spaces; and,
a shoulder for engaging the anterior end of the breastbone of a bird mounted thereon.

11. A poultry processing apparatus for transporting and operating on eviscerated birds, comprising,
a track;
a plurality of carriers which are engaged with said track for movement therealong in a direction of travel;
a plurality of bird mounting units supported on said carriers;
a plurality of processing means spaced along said track for performing operations on birds on said mounting units; a mandrel for holding a bird which has a back and a breast,
said mandrel being mounted on a carrier and being movable with respect to its carrier in a plane which is parallel to said direction of travel, means for orienting said mandrel in a back-up position where the bird's back faces upwardly, drive means for moving the mandrel in a direction which moves the bird in an anterior direction when the mandrel is in said back-up position, and means for removing means from the bird when it is in moving anteriorly in its back-up position;
means for orienting the mandrel in a breast-up position where the bird's breast faces upwardly, said drive means moving the mandrel in a direction which moves the bird in an anterior direction when the mandrel is in its breast-up position, and means for removing meat from the bird when it is moving anteriorly in its breast-up position.

12. Apparatus according to claim 11 including having means for moving the mandrel to an upright position which is between said breast-up and back-up positions.

13. Apparatus according to claim 11 wherein the drive means includes two sections both of which move the mandrel at a constant velocity.

14. Apparatus according to claim 11 wherein the drive means includes two sections which respectively move the mandrel in opposite directions.

15. Apparatus according to claim 11 wherein the drive means includes two sections, and the mandrels are intermittently moved from one said drive means section to the other said drive means section.

16. Apparatus according to claim 11 wherein the carrier changes its direction of movement without bodily turning.

17. A poultry processing method for removing meat from the body of an eviscerated bird, said method including the following steps:
placing a said bird on a mandrel supported on a carrier,
moving said carrier along a fixed path through a plurality of processing stations where portions of meat are automatically removed from said body while said body remains on the mandrel,
moving said mandrel to different orientations relative to the carrier as it moves along said path, said different orientations including a breast-up position and a back-up position, said orientations of the body being such that the body has its anterior end facing in the direction of movement when it is in its breast-up position and when it is in its back-up position,
removing the entire body from the mandrel after said portions of meat have been removed from it.

18. A method according to claim 17 including the steps of moving said mandrel continuously through some of said processing stations and moving the mandrel intermittently through other said processing stations.

19. A method according to claim 17 including the step of changing the direction of movement of said carrier without bodily turning it as it moves along said path.

20. A method according to claim 17 including the steps of moving the mandrel to different orientations relative to the carrier as it moves along said path.

21. A method according to claim 20 wherein said different orientations include a breast-up position and a back-up position.

22. A method according to claim 21 wherein said mandrel is moved in an opposite direction when in its breast-up position than when it is in its back-up position, said orientations of the body being such that the body has its anterior end facing in the direction of movement when it is in its breast-up position and when it is in its back-up position.

23. Poultry processing apparatus for transporting and operating on eviscerated birds, comprising,
   a track;
   a plurality of carriers which are engaged with said track for movement therealong;
   a plurality of bird mounting units supported on said carriers;
   processing means located along said track for performing operations on birds on said mounting units;
   said track including at least one corner section where said carriers change their direction of movement without bodily turning, said carriers being spaced from each other when they move toward said corner section, and means for coupling said carriers to each other at said corner section so they are connected together as they move away from said corner section.

24. Apparatus according to claim 23 wherein said means for moving said carriers intermittently includes a rotary cam with a forwardly facing cam surface, each of said carriers having a cam follower surface which is engaged by said forwardly facing cam surface whereby rotation of said rotary cam drives said carriers forwardly.

25. Apparatus according to claim 24 wherein said carriers have disengageable coupling means for connecting adjacent carriers together, said rotary cam having a rearwardly facing cam surface, cam follower surfaces on two adjacent carriers being engageable respectively by said rearwardly facing cam surface and said forwardly facing cam surface, said rearwardly facing cam surface and said forward facing cam surface converging toward each other to move said cam follower surfaces of adjacent carriers toward each other to engage the couplings means of the adjacent carriers.

26. Apparatus according to claim 24 wherein said rotary cam has a rearwardly facing cam surface for decelerating the cam follower surfaces and their respective carriers.

27. A poultry processing apparatus for transporting and operating on eviscerated birds, comprising,
   a track;
   a plurality of carriers which are engaged with said track for movement therealong, said carriers being provided with cam followers;
   a plurality of bird mounting units supported on said carriers;
   a plurality of processing means located along said track for performing operations on birds on said mounting units; drive means for intermittently driving said carriers along at least a portion of said track, said drive means including a rotary cam provided with a forwardly facing surface which engages said cam followers to drive their respective carriers in a forward direction, said rotary cam having a rearwardly facing cam surface for engaging a said cam follower to decelerate its respective carrier.

said carriers being provided with interengaging coupling means for holding adjacent carriers together during their intermittent movement along the track.

28. Apparatus according to claim 27 wherein said forwardly facing and rearwardly facing cam surfaces are mutually convergent to move two adjacent carriers toward each other to engage their coupling means.

29. A poultry processing method for removing meat from the body of an eviscerated bird, said method including the following steps:
   placing a said bird on a mandrel supported on a carrier,
   moving said carrier along a fixed path through a plurality of processing stations where portions of meat are automatically removed from said body while said body remains on the mandrel,
   moving said mandrel to different orientations relative to the carrier as it moves along said path, said different orientations including a breast-up position and a back-up position,
   said mandrel being moved in an opposite direction when in its breast-up position than when it is in its back-up position, said orientations of the body being such that the body has its anterior end facing in the direction of movement when it is in its breast-up position and when it is in its back-up position, and
   removing the entire body from the mandrel after substantially all of the meat has been removed from it.

30. Poultry processing apparatus for transporting and operating on eviscerated birds which each have skin, wings, a body comprising (a) a breastbone, (b) a backbone and (c) a back, said body having a hollow interior which has an internal kidney space, a leg which includes a thigh bone, a thigh joint connecting the thigh bone to the body, said thigh joint including ligaments and tendons, said apparatus comprising,
   a rectangular track, said track including at least one corner section where said carriers change their direction of movement without bodily turning;
   a plurality of carriers which are engaged with said track for movement therealong, said carriers being provided with cam followers;
   drive means including a continuous drive means for continuously moving the carriers along two opposite sides of the rectangular track and an intermittent drive means for intermittently moving the carriers along two opposite sides of the rectangular track; said intermittent drive means including a rotary cam providing with a forwardly facing surface which engages said cam followers to drive their respective carriers in a forward direction, said rotary cam having a rearwardly facing cam surface for engaging a said cam follower to decelerate its respective carrier;
   said continuous drive means moving said carriers continuously toward said corner section, said intermittent drive means moving said carriers intermittently away from said corner section;
   a plurality of bird mounting means supported on said carriers, each bird mounting means including a mandrel having an anterior end and a shape adapted to that of the hollow interior of a bird's body, said mandrel being shaped to enter and securely hold the body of a bird thereon, said mandrel having a centering rib provided with a groove for receiving a bird's backbone, said mandrel also having a projection beside the groove for engaging a kidney space of the hollow interior of a bird's body, said projection being inclined in a direction toward the anterior end of the mandrel;

a plurality of processing means located along said track for performing operation on birds on said mounting means;

said mandrel being movable with respect to its carrier in a plane which is parallel to its direction of travel, means for orienting said mandrel in a back-up position where the bird's back faces upwardly, said drive means moving the mandrel in a direction which moves the bird in an anterior direction when the mandrel is in said back-up position, said processing means including thigh removal means for removing meat from the bird when it is in moving anteriorly in its back-up position;

means for orienting the mandrel in a breast-up position where the bird's breast faces upwardly, said drive means moving the mandrel in a direction which moves the mandrel in an anterior direction when the mandrel is in its breast-up position, said processing means including means for removing meat from the bird when it is moving anteriorly in its breast-up position;

said thigh removal means being operable for removing a thigh from a body of a bird, said drive means being operable to move the bird's body through the thigh removal means in a fixed path in a machine direction, said thigh removal means including the following:

means for cutting the skin of the bird around the perimeter of the thigh, a pair of guide rods which extend in the machine direction and are positioned to lie on opposite sides of the body with the legs and wings lying outboard of said guide rods, each of said guide rods having a raised portion for lifting both a wing and a leg of a bird as it moves therealong so that said wing and leg move along respective raised paths, a pair of disjointing rods spaced from the raised paths of the wings but lying in the raised paths of the legs whereby the legs but not the wings move into contact with the disjointing rods, said disjointing rods being inclined relative to the fixed path of the bird's body so that movement of the bird causes the disjointing rods to pivot the thigh bones about the thigh joints to disjoint the thigh joints, a tendon-cutting blade for cutting thigh joint ligaments and/or tendons, actuating means operable each time a bird moves through the apparatus for moving the blade from a retracted position where it is outside the path of the bird to a cutting position where it cuts the ligaments and/or tendons of a disjointed thigh joint, and means for pulling the thighs to separate them from the body of the bird.

* * * * *